(12) United States Patent
Maier et al.

(10) Patent No.: US 8,960,447 B2
(45) Date of Patent: Feb. 24, 2015

(54) BLADED DRUM FOR ROTARY SEPARATOR SYSTEM AND METHOD

(75) Inventors: William C. Maier, Almond, NY (US); Gocha Chochua, Sugar Land, TX (US)

(73) Assignee: Dresser-Rand Company, Olean, NY (US)

( * ) Notice: Subject to any disclaimer, the term of this patent is extended or adjusted under 35 U.S.C. 154(b) by 346 days.

(21) Appl. No.: 13/038,941

(22) Filed: Mar. 2, 2011

(65) Prior Publication Data

US 2011/0220591 A1 Sep. 15, 2011

Related U.S. Application Data

(60) Provisional application No. 61/312,067, filed on Mar. 9, 2010.

(51) Int. Cl.
| | |
|---|---|
| *B01D 19/00* | (2006.01) |
| *B04B 1/04* | (2006.01) |
| *B04B 7/12* | (2006.01) |
| *B01D 17/038* | (2006.01) |
| *B01D 53/24* | (2006.01) |
| *B01D 17/02* | (2006.01) |
| *B01D 46/00* | (2006.01) |
| *B04B 7/08* | (2006.01) |
| *F22B 37/32* | (2006.01) |

(52) U.S. Cl.
CPC ........ *B01D 17/0217* (2013.01); *B01D 19/0057* (2013.01); *B01D 46/0056* (2013.01); *B01D 53/24* (2013.01); *B04B 1/04* (2013.01); *B04B 7/08* (2013.01); *B04B 7/12* (2013.01); *F22B 37/32* (2013.01)
USPC ..................... 210/380.1; 210/512.3; 210/787; 210/784; 494/54; 96/155; 95/261; 95/270

(58) Field of Classification Search
USPC ................. 210/801, 802, 781, 787, 780, 800, 210/360.1, 380.1, 380.3, 379, 378, 377, 210/402, 404, 512.3, 512.1, 784; 494/50–55; 95/34, 35, 261, 270, 267, 95/269, 272; 96/155; 55/406–408
See application file for complete search history.

(56) References Cited

U.S. PATENT DOCUMENTS

| | | | | |
|---|---|---|---|---|
| 2,661,076 A | * | 12/1953 | Walker | ............................. 55/317 |
| 3,720,045 A | * | 3/1973 | Murphy | ........................... 55/306 |
| 4,832,709 A | * | 5/1989 | Nagyszalanczy | ............... 95/270 |

* cited by examiner

*Primary Examiner* — David C Mellon
(74) *Attorney, Agent, or Firm* — Edmonds & Nolte, PC

(57) ABSTRACT

A separator method and apparatus that includes a rotatable drum defining an annular passageway therein, a plurality of blades coupled to the rotatable drum and located in the annular passageway, each of the plurality of blades including a leading section, a trailing section, a concave surface, and a convex surface, the concave and convex surfaces extending from the leading section to the trailing section, each of the plurality of blades disposed circumferentially adjacent to at least another one of the plurality of blades so as to define blade flowpaths therebetween, and a housing at least partially surrounding the rotatable drum and defining a fluid collection chamber fluidly communicating with the annular passageway.

15 Claims, 10 Drawing Sheets

BLADED DRUM FOR ROTARY SEPARATOR SYSTEM AND METHOD

CROSS-REFERENCE TO RELATED APPLICATIONS

This application claims priority to U.S. Provisional Patent Application having Ser. No. 61/312,067, which was filed Mar. 9, 2010. The priority application is hereby incorporated by reference in its entirety into the present application.

BACKGROUND

In many industrial processes where it is desired to compress a process fluid, the process fluid includes both lower-density and higher-density components, for example, gases and liquids, respectively. Liquids, however, can potentially damage, corrode, reduce the efficiency of, and/or wear on the compression equipment; therefore, it is generally desirable to remove as much of the liquid from the process fluid as possible, prior to compression. This is balanced against avoiding significant increases in materials and operating expenses, along with retaining a sufficient throughput rate. One way to remove such liquid is to channel the process fluid through a density-based separator, such as a rotary separator, thereby separating and expelling the higher-density components from the lower-density components of the process fluid. To achieve a desired separation efficiency, the axial length of rotary separators is typically dictated by the axial velocity of the process fluid, the radial velocity of the liquid that is induced by the rotational motion of the rotary separator, and the radial distance the liquid must travel before reaching the drain. These factors limit the ability to reduce the axial length of these rotary separators and equipment in which the separators may be included. What is needed, therefore, is a rotary separator that can efficiently separate the process fluid at a high axial velocity over a shorter axial distance.

SUMMARY

Embodiments of the disclosure may provide an exemplary separator apparatus. The separator apparatus may include a rotatable drum defining an annular passageway extending axially therethrough, with the rotatable drum being configured to separate a higher-density component of a fluid from a lower-density component of the fluid. The separator apparatus may also include a plurality of blades coupled to the rotatable drum, located in the annular passageway, and being configured to rotate with the rotatable drum, each of the plurality of blades including a leading section, a trailing section, a concave surface, and a convex surface, the concave and convex surfaces extending from the leading section to the trailing section, each of the plurality of blades being disposed circumferentially adjacent to at least another one of the plurality of blades so as to define blade flowpaths therebetween. The separator apparatus may further include a housing at least partially surrounding the rotatable drum and defining a fluid collection chamber fluidly communicating with the annular passageway.

Embodiments of the disclosure may also provide an exemplary method for separating a mixed process fluid. The method may include introducing the mixed process fluid to a rotary separator drum, the mixed process fluid including a higher-density component and a lower-density component. The method may further include centrifugally separating of at least a portion of the higher-density component from the lower-density component. Centrifugally separating the portion of the higher-density component from the lower density component may include rotating the rotary separator drum with the mixed process fluid introduced therein, and directing the mixed process fluid between curved blades disposed circumferentially adjacent one another in the rotary separator drum. The method may also include directing the separated higher-density component to an outer wall of the rotary separator drum.

Embodiments of the disclosure may further provide an exemplary apparatus for separating a higher-density component from a lower-density component of a process fluid. The apparatus may include a housing defining a fluid collection chamber, a housing inlet, and a housing outlet. The apparatus may further include a drum rotatably positioned between the housing inlet and the housing outlet and including an inner wall and an outer wall that is disposed around the inner wall and radially offset therefrom to define a passageway therebetween, the passageway including an entrance located proximal the housing inlet and an exit located proximal the housing outlet, the passageway extending an axial length between the entrance and exit and communicating with the fluid collection chamber. The apparatus may also include a plurality of blades extending at least partially between the inner and outer walls of the drum and disposed around the drum and at least partially along the axial length of the passageway, each of the plurality of blades having a leading section, a trailing section, a convex surface, and a concave surface, the convex and concave surfaces extending from the leading section to the trailing section.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
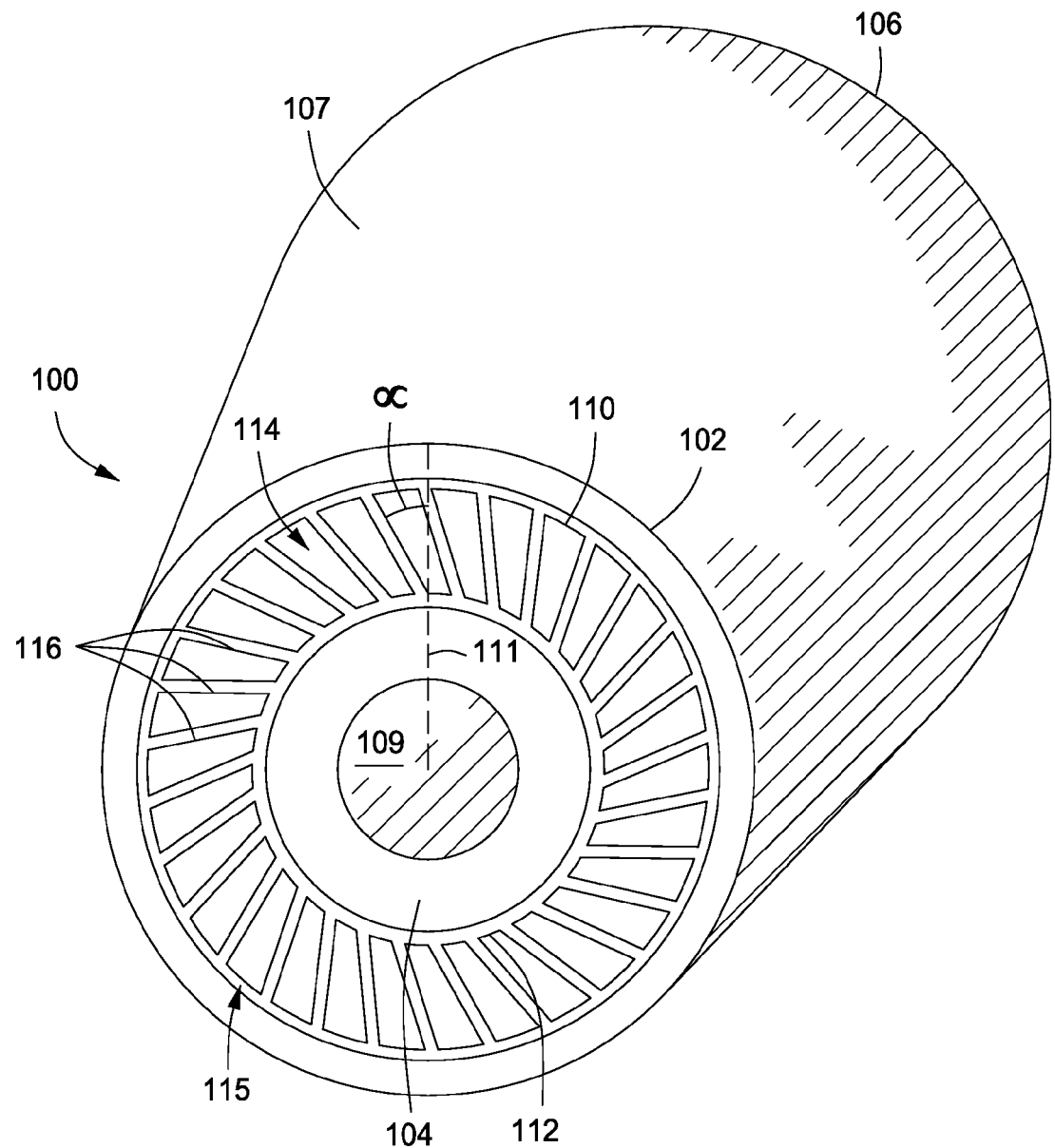
FIG. 1 illustrates an isometric view of an exemplary rotary separator drum, in accordance with the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims, the term "or" is intended to encompass both exclusive and inclusive cases, i.e., "A or B" is intended to be synonymous with "at least one of A and B," unless otherwise expressly specified herein.

FIG. 1 illustrates a rotary separator 100, according to an exemplary embodiment. The rotary separator 100 includes a rotatable drum 102 having a front surface 104, a rear surface 106 located axially opposite the front surface 104, and an outer surface 107 that extends between the front surface 104 and the rear surface 106. In an exemplary embodiment, the drum 102 may increase in diameter proceeding from the front surface 104 to the rear surface 106, such that the drum 102 is substantially frustoconical. In another exemplary embodiment, a center region between the front and rear surfaces 104, 106 may be enlarged in diameter (not shown) relative to both the front and rear surfaces 104, 106. In yet another exemplary embodiment, the drum 102 may maintain a substantially constant diameter such that the drum 102 is cylindrical. In various other exemplary embodiments, the drum 102 may include one or more of a variety of different shapes. Furthermore, it will be appreciated that the front and rear surfaces 104, 106 may be reversed, without departing from the scope of this disclosure.

The drum 102 may define a central bore 109 extending axially therethrough, for example, from the front surface 104 to the rear surface 106. The central bore 109 may receive a shaft (not shown), such that the drum 102 may be rotated by an external source of rotational energy, such as a turbine, motor, or the like, or may instead provide rotational energy to an external device (not shown), such as a generator or a compressor. The drum 102 may also have an outer wall 110 and an inner wall 112, with the outer and inner walls 110, 112 being generally concentric with respect to each other. The outer and inner walls 110, 112 may be radially offset from each other, defining passageway 114 therebetween, with the passageway 114 having an entrance 115 proximal the front surface 104, as shown. In an exemplary embodiment, the geometry of the passageway 114 may generally conform to the geometry of the drum 102, such that, in an exemplary embodiment in which the drum 102 is frustoconical, the passageway 114 is also frustoconical. In various exemplary embodiments, however, the passageway 114 can be cylindrical or any other suitable shape.

The rotary separator 100 also includes a plurality of blades 116, which may extend radially through at least a part of the passageway 114. For example, the plurality of blades 116 may be coupled to and extend between the outer and inner walls 110, 112. Any number of blades 116 may be employed, and each may be spaced circumferentially apart from the others around the drum 102. Furthermore, the blades 116 may be coupled to the outer and inner walls 110, 112 using fasteners, welding, brazing, dovetail fitting, or the like, may be cast, cut, or otherwise formed integrally with the drum 102, and/or may be coupled to the outer and/or inner walls 110, 112, by any other suitable process. Additionally, the blades 116 may have a lean angle α with respect to a radial line 111. The blades 116 may lean clockwise or counterclockwise depending on the direction the drum 102 is configured to rotate. In various exemplary embodiments, the lean angle α may range from about 8 degrees, about 11 degrees, or about 14 degrees to about 17 degrees, about 20 degrees, or about 22 degrees. In at least one exemplary embodiment, the lean angle α may be about 15 degrees.

Figure 2:
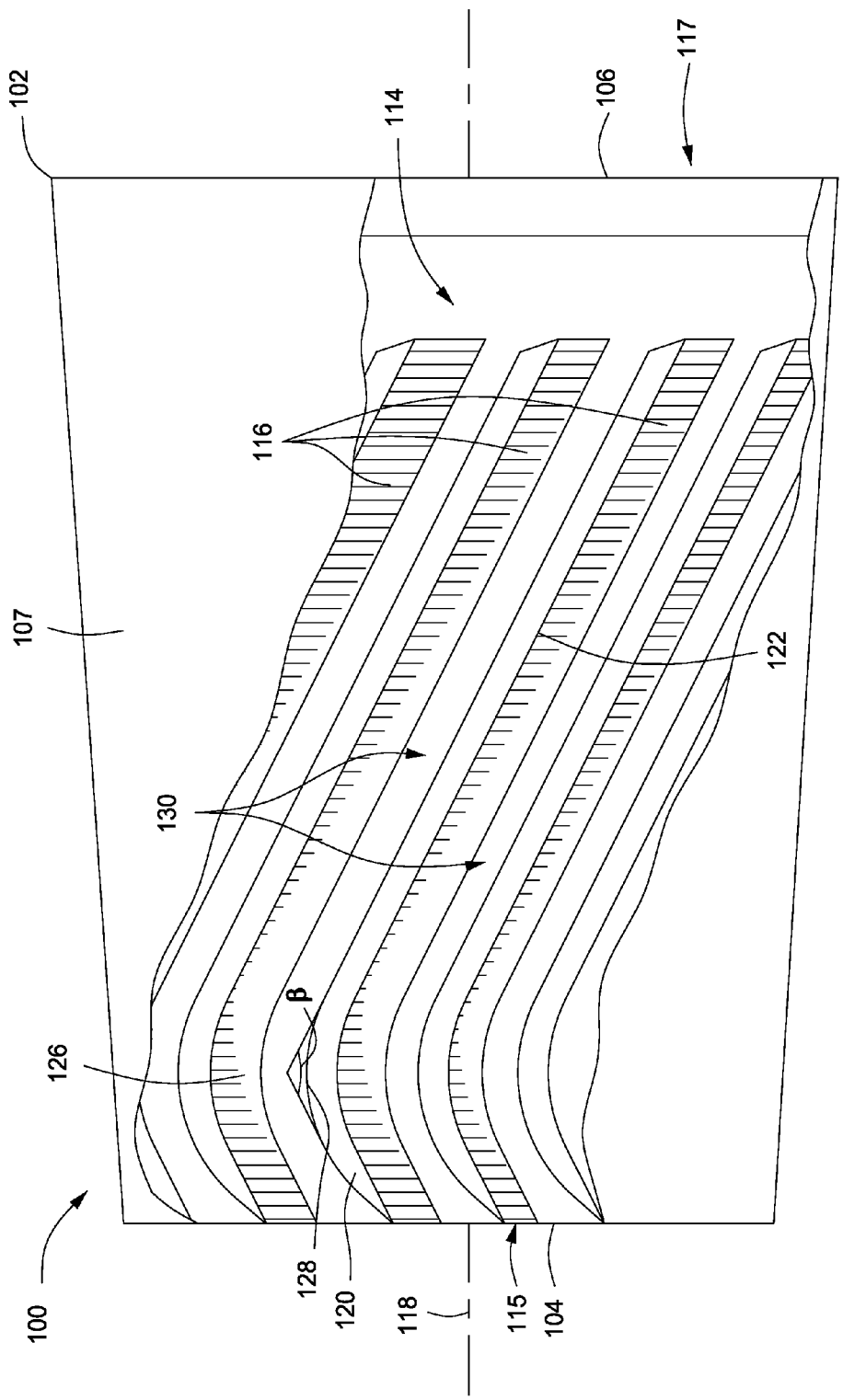
FIG. 2 illustrates a cut-away, side perspective view of the rotary separator drum, in accordance with the disclosure.

FIG. 2 illustrates a side perspective view of the rotary separator 100, according to an exemplary embodiment, showing the drum 102 with the outer surface 107 partially broken away to reveal the passageway 114 extending between the front and rear surfaces 104, 106. An axis 118 may be defined through the middle of the drum 102, about which the drum 102 rotates. Further, each of the plurality of blades 116 includes a leading section 120, which may be tapered to a thin edge, as shown, and a trailing section 122. The leading and trailing sections 120, 122 are connected together by a curved portion, which may include concave and convex surfaces 126, 128. Each blade 116 may be precision-cast, milled from a solid block, or otherwise integrally-formed, or made of multiple parts that are fixed together. Each blade 116 may be arranged so that the leading section 120 is generally positioned upstream (i.e., proximal the front surface 104 and/or the entrance 115) in the passageway 114 relative to the trailing section 122. In at least one exemplary embodiment, the leading section 120 of each of the blades 116 is positioned adjacent the front surface 104 of drum 102. Moreover, the concave surface 126 may be also be referred to as the pressure surface of the blade 116 and convex surface 128 may also be referred to as the suction surface of the blade 116.

Between adjacent blades 116 there is defined an inter-blade flowpath 130. Each inter-blade flowpath 130 may be defined by the leading and trailing sections 120, 122 and the convex surface 128 of one blade 116, and the leading and trailing sections 120, 122 and the concave surface 126 of another blade 116. The inter-blade flow path 130 may extend axially, at least partially from the entrance 115 to the exit 117 of the passageway 114. Furthermore, the trailing section 122 may be angled relative to the leading section 120 to define an angle β. The angle β may range from about 90 degrees, about 100 degrees, or about 110 degrees to about 130 degrees, about 140 degrees, or about 150 degrees. In at least one exemplary embodiment, the angle β may be about 120 degrees.

In an exemplary embodiment, each of the plurality of blades 116 may be substantially identical; however, in various other exemplary embodiments, the shape, structure, and/or material of the blades 116 may vary. Furthermore, the trailing section 122 of the blades 116 may extend a length that is at least about twice as long as the length leading section 120. In various exemplary embodiments, each of the blades 116 may extend along at least about 60%, at least about 70%, or at least about 80% of a length of the drum 102 from the front surface 104 to the rear surface 106. In an exemplary embodiment, the length of the blades 116 may be substantially the same; however, in various other exemplary embodiments, the blades 116 may vary in length.

Figure 3:
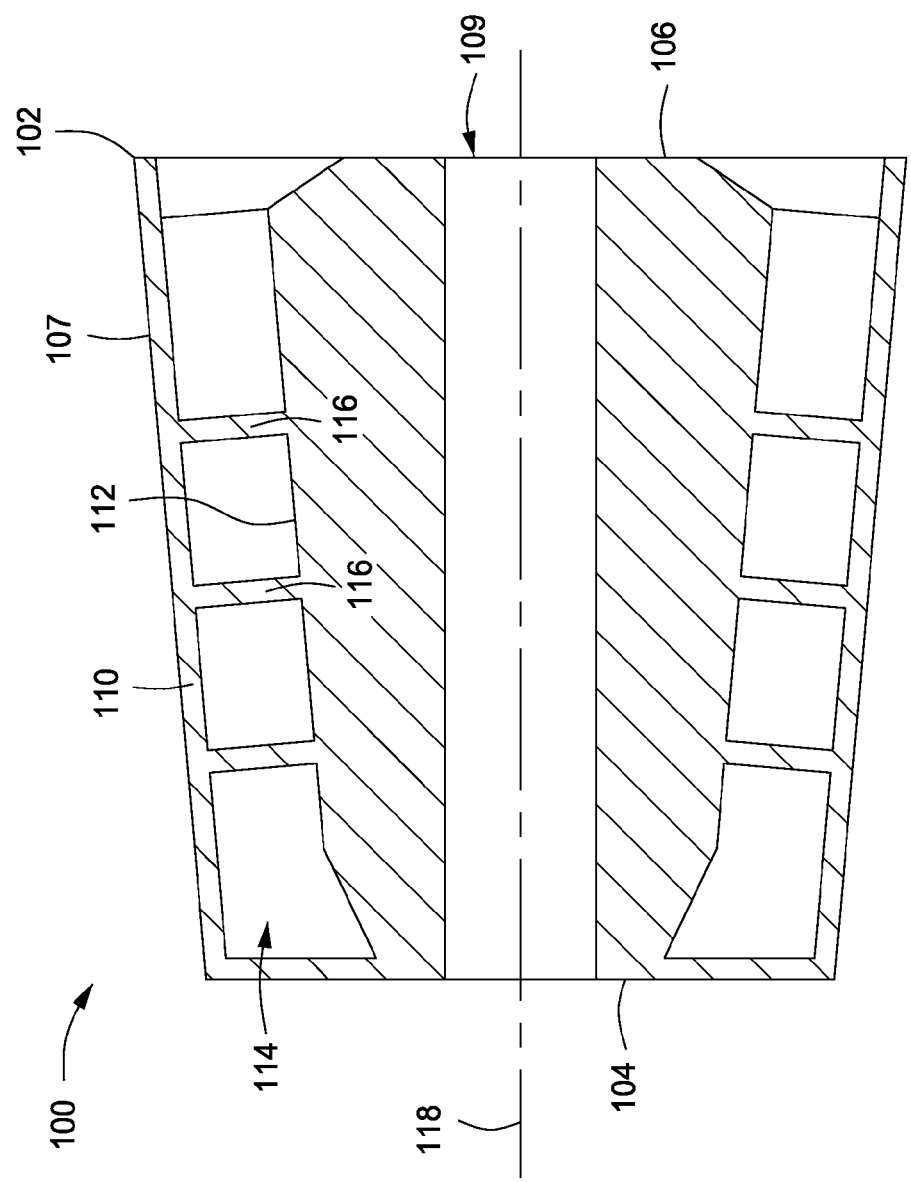
FIG. 3 illustrates a cross-sectional side view of the rotary separator drum, in accordance with the disclosure.

FIG. 3 illustrates a cross-section of the rotary separator 100 of FIG. 2, according to an exemplary embodiment. It will be appreciated that the curved blades 116 each appear where they intersect the plane illustrated by the cross-section; therefore, several of the blades 116 of the illustrated embodiment are shown, with each appearing as one or two rectangles in FIG. 3. Moreover, FIG. 3 illustrates a frustoconical embodiment of the drum 102, with accordingly frustoconical outer and inner walls 110, 112 and outer surface 107. As shown, the axis 118 may be defined through the central bore 109, such that the drum 102 can be rotated thereabout.

As also noted above with reference to FIG. 1, the outer and inner walls 110, 112 may be radially offset from each other, defining the passageway 114 therebetween, with the blades 116 extending at least partially through the passageway 114. In various exemplary embodiments, the outer and inner walls 110, 112 may be substantially parallel, as shown, or may be converging. Furthermore, the outer and inner walls 110, 112 may increase in diameter from the front surface 104 to the rear surface 106 at an angle of from about 3 degrees to about 6 degrees proceeding from the front surface 104 to the rear surface 106.

Figure 4:
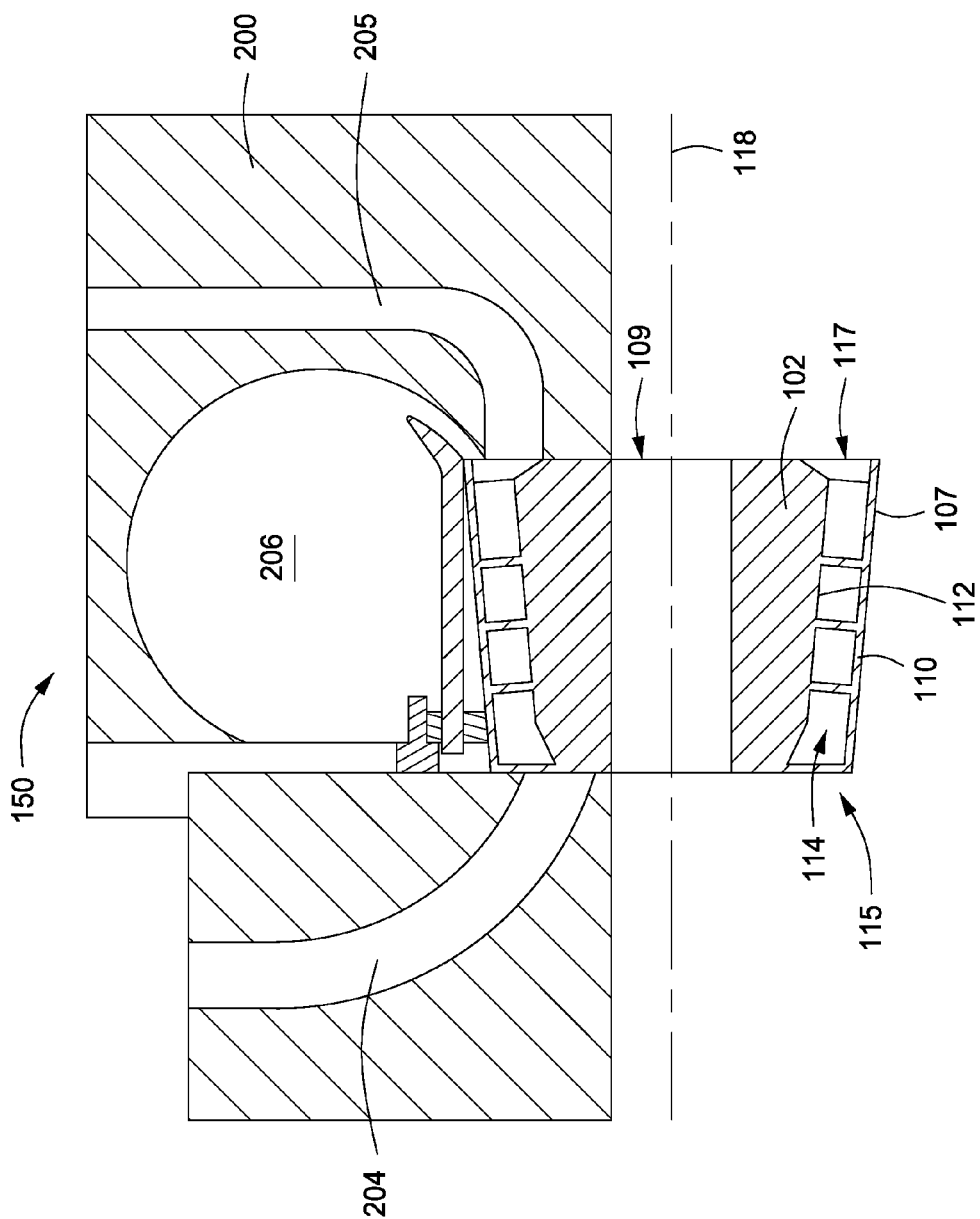
FIG. 4 illustrates a cross-sectional view of the rotary separator drum coupled to a housing, in accordance with the disclosure.

FIG. 4 illustrates a partial cross-sectional view of a rotary separator system 150, according to an exemplary embodiment, which incorporates the drum 102 of the rotary separator 100 (FIGS. 1-3). The rotary separator system 150 may include a housing 200, which may be substantially symmetric about the axis 118, and which includes an inlet 204, an outlet 205, and a collection chamber 206. The drum 102 is positioned in the housing 200 such that the entrance 115 of passageway 114 is located proximal, for example, adjacent and aligned with, the inlet 204, while the exit 117 is located proximal, for example, adjacent and aligned with, the outlet 205 of the housing 200. In an exemplary embodiment, fluid flowing along the outer wall 110 is directed into the collection housing 206, while liquid flowing proximal the inner wall 112 flows into the outlet 205. In various exemplary embodiments, the outlet 205 can be, include, or be fluidly coupled to, an impeller of a centrifugal compressor. In other exemplary embodiments, the outlet 205 can be, include, or be coupled to any other device.

With additional reference to FIG. 3, in exemplary operation, a mixed process fluid may be introduced to the rotary separator system 150 via the inlet 204. In the inlet 204, the mixed process fluid may include a higher-density component and a lower-density component. In an exemplary embodiment, the lower-density component may be gas and the higher-density component may be liquid; however, it will be appreciated that the higher-density component may be or include relatively dense liquids, gases, solids, or any combination thereof, while the lower-density component may be or include relatively less-dense liquids, gases, solids, or any combination thereof. For example, the rotary separator 150 may be operable to separate denser gases from less-dense gases, solids from liquids, denser liquids from less-dense liquids, or any combination thereof.

The mixed process fluid may then proceed to the entrance 115 of the passageway 114 of the drum 102. The drum 102 may be rotated about its axis 118 via a shaft (not shown) received into the central bore 109, with the shaft being powered by an external mechanism (not shown) such as a turbine, motor, or the like. In other exemplary embodiments, the drum 102 may be instead or additionally be rotated by the energy in the mixed process fluid flow as it engages the blades 116. Subsequently, the mixed process fluid may continue into the passageway 114 and flow toward the exit 117. During flow through passageway 114, separation of the various components of the process fluid is enhanced utilizing the blades 116, as will be described in further detail below.

Figure 5:
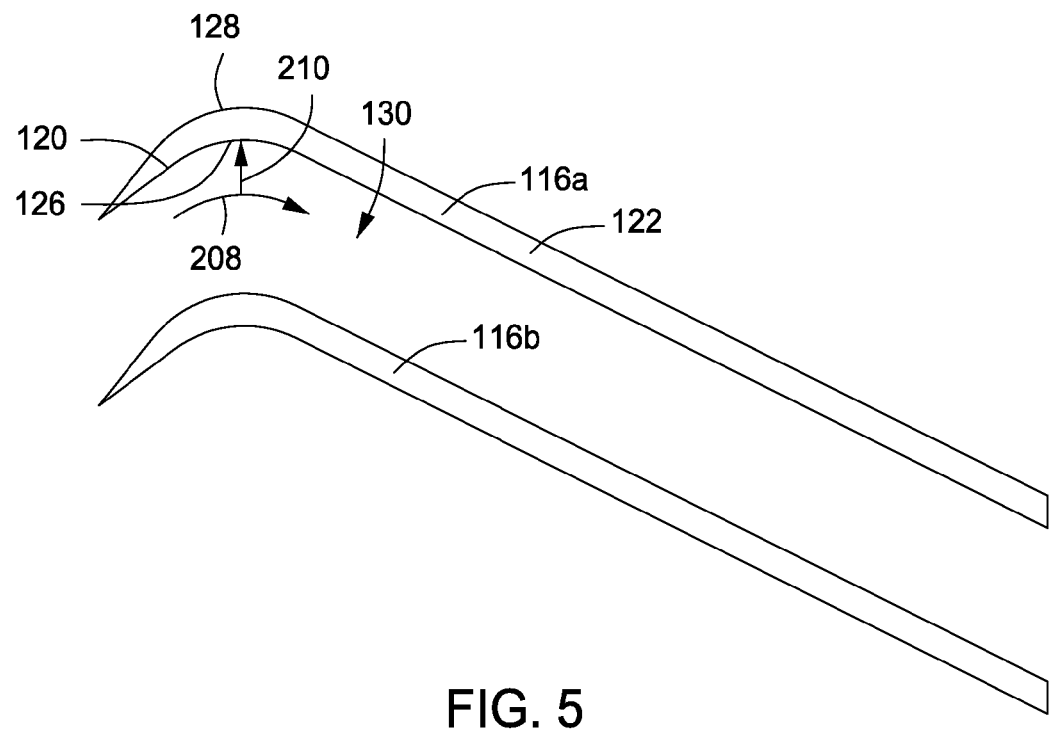
FIG. 5 illustrates side view of two exemplary blades of the rotary separator with a process fluid being directed therebetween, in accordance with the disclosure.

FIG. 5 illustrates a pair of blades 116a,b with the inter-blade flow passage 130 defined therebetween, according to an exemplary embodiment. As the process fluid flows along passageway 114 (FIGS. 1-4), the flowpath of the process fluid therein may be constrained by the blades 116a,b, thereby forcing the process fluid to flow through the inter-blade flow passage 130 and across blades 116a,b. Thus, in the inter-blade flow passage 130, higher-density components of the process fluid will be driven to the concave side 126 of the blade 116a, as shown by arrow 210, while lower-density components of the process fluid will flow adjacent the convex side 128 of the second blade 116b. The higher-density may thus coalesce on the concave side 126 of the blade 116a.

Figure 6:
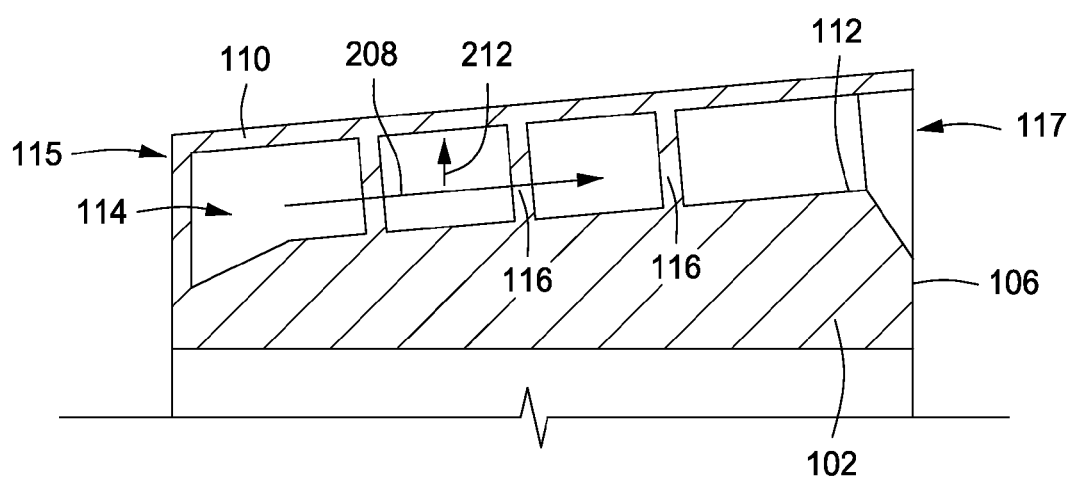
FIG. 6 illustrates a partial cross-sectional view of the rotary separator drum, showing a process fluid shown moving therein, in accordance with the disclosure.

With continuing reference to FIG. 5, FIG. 6 illustrates the process fluid traveling through the passageway 114 from the entrance 115 toward the exit 117, as shown by the arrow 208. As described above, at least some of the higher-density component of the process fluid coalesces on the concave surface 126. Due to the continued rotation of the drum 102, the coalesced higher-density component is centrifuged outward, as shown by arrow 212. Additional amounts of the higher-density component may also be centrifuged directly out of the process fluid stream via the rotation of the drum 102, without necessitating engagement with the blades 116. The separated higher-density component is thus directed to the outer wall 110 for collection.

The blades 116 may be dimensioned or otherwise angled such that substantially all of the higher-density component coalesced thereon engages the outer wall 110 before reaching the exit 117. Thus, when the process fluid arrives at a point adjacent the rear surface 106 of the drum 102, substantially all of the higher-density component in the process fluid may engage the outer wall 110 and substantially all of the lower-density component may remain in passageway 114 between the outer wall 110 and the inner wall 112. However, in various exemplary embodiments, the lower-density component may engage the inner wall 112 as well. The lower-density component of the process fluid may move through the exit 117 defined by the rotary separator 100 to the outlet 205, while the higher-density component of the process fluid may be directed into the collection chamber 206 (FIG. 4), and ultimately to a drain (not shown) connected to the housing 200 (FIG. 4).

Figure 7:
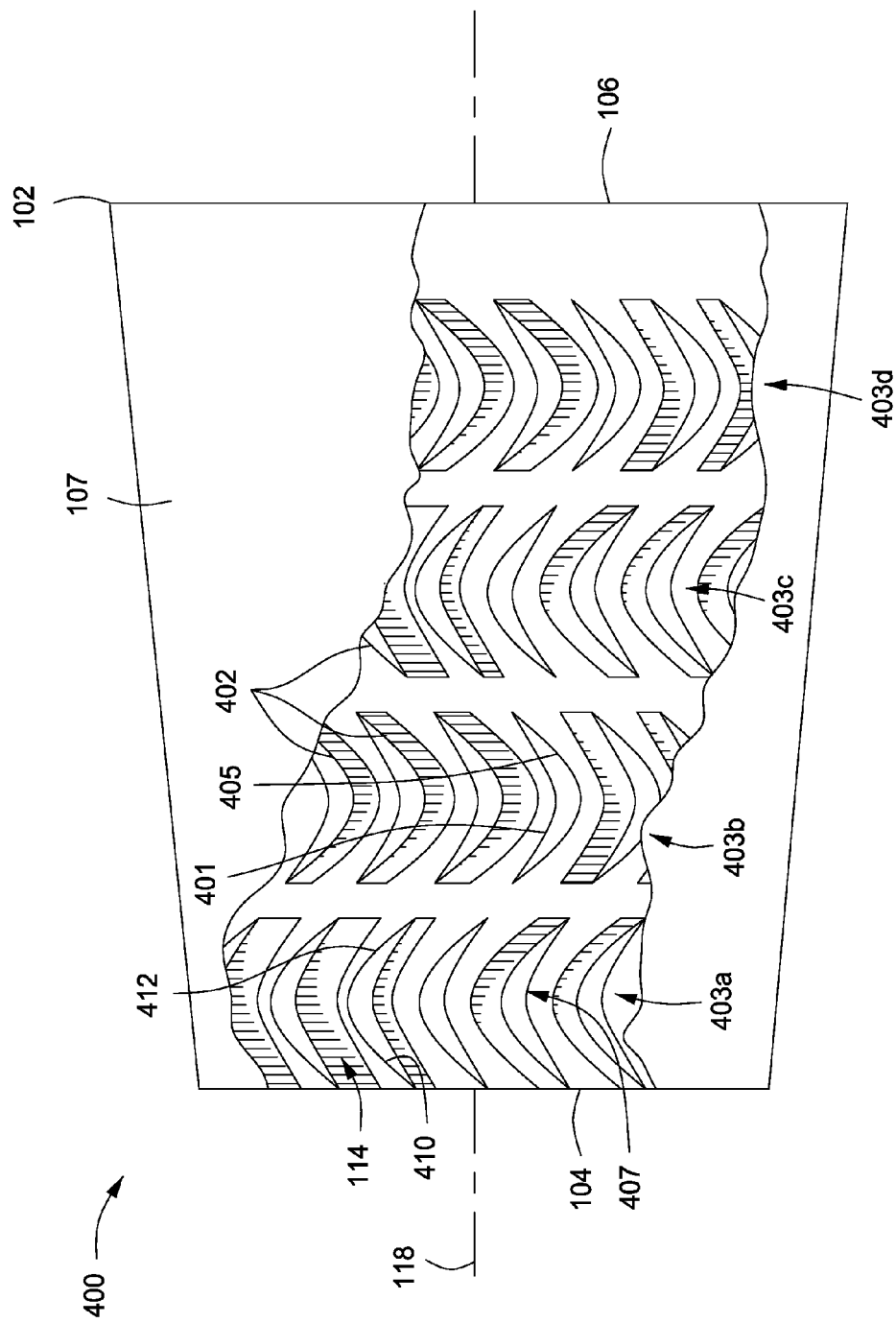
FIG. 7 illustrates a cut-away, side perspective view of another exemplary rotary separator drum, in accordance with the disclosure.

FIG. 7 illustrates another rotary separator 400, according to an exemplary embodiment, shown with a portion of the outer surface 107 broken away to reveal the passageway 114. The rotary separator 400 may be substantially similar to the rotary separator 100, shown in and described above with reference to FIGS. 1-6, and may be best understood with reference thereto. However, the rotary separator 400 includes a plurality of blades 402 arranged in a plurality of blade rows 403a, 403b, 403c and 403d in the drum 102. In an exemplary embodiment, a trailing section 412 of each blade 402 of rows 403a-c is proximal a leading section 410 of a blade 402 in a subsequent row 403b-d, as shown. Moreover, each blade 402 may include a concave surface 401 and a convex surface 405. Further, each blade 402 may be positioned in the passageway 114 between the front surface 104 and the rear surface 106. Additionally, each of the blades 402 may be spaced-apart from each other so as to form inter-blade flow passages 407 between adjacent blades 402. In an exemplary embodiment, each row of blades 403a-d extends around the circumference of the passageway 114; however, in various other exemplary embodiments, one or more of the rows of blades 403a-d may stop at a point, and/or the rows 403a-d may be staggered around the drum 402. Other orientations will be readily apparent in accordance with this disclosure. Furthermore, adjacent rows 403a-d may face in opposing circumferential directions, as shown. For example, the concave surface 405 of the blades 402 in the first row 403a faces "down," as shown from the side, corresponding to a clockwise circumferential direction, while the concave surface 405 of the blades 402 in the second row 403b faces "up," as shown from the side, corresponding to a counterclockwise circumferential direction.

Figure 8:
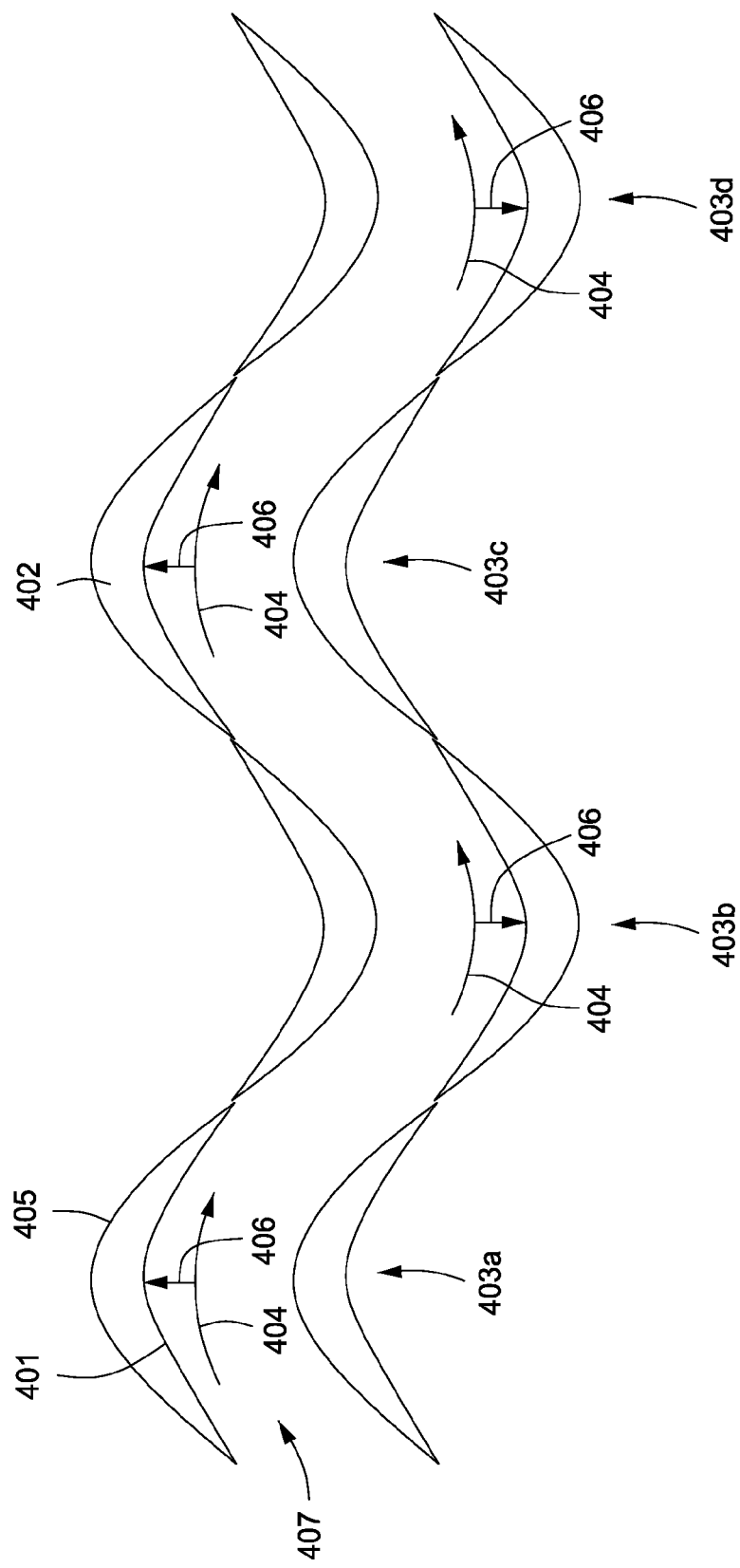
FIG. 8 illustrates a side view of a plurality of exemplary blades of the embodiment of the rotary separator drum shown in FIG. 7, showing a process fluid moving between the blades, in accordance with the disclosure.

FIG. 8 illustrates a portion of each of the blade rows 403a-d, according to an exemplary embodiment, with the rows 403a-d arranged in alternating sequence and the inter-blade flow path 407 defined therebetween. The rows 403a-d are arranged such that a fluid flowing along a convex surface 405 of a blade 402 in one row 403a-d will be directed to the concave surface 401 of a blade 402 in an adjacent row 403a-d, as shown by arrow 404. Likewise, a fluid flowing along a concave surface 405 of a blade 402 in one row 403a-d will be turned to the convex surface 401 of a blade 402 in an adjacent row 403a-d. Accordingly, a fluid flowing through the inter-blade flowpath 130 is turned toward a first circumferential direction while traversing the first row of blades 403a, and is turned toward an opposing second circumferential direction while traversing the second row of blades 403b. This alternating turning provides a blade-to-blade acceleration and thus a resulting blade-to-blade centrifugal force. The blade-to-blade centrifugal force drives the higher-density components of the process fluid in the direction illustrated by arrows 406 against the high-pressure surface, i.e., the concave surface 401 of the blades 402.

In one or more embodiments, each row 403a-d may turn the flowpath 404 about 60 degrees (e.g., +/− about 30 degrees relative to axis 118 shown in FIGS. 2-4). By alternating the flowpath direction, separation of components within a process fluid may be further enhanced with respect to a single blade row embodiment, by forcing the higher-density components to the concave surface 401 bounding the inter-blade flow path 407. In at least one exemplary embodiment, adjacent blade rows 403a-d may be staggered circumferentially around the drum 102 (FIG. 7) in order to maximize the amount of process fluid that travels to the concave surface 401 with each turning of the process fluid.

Figure 9:
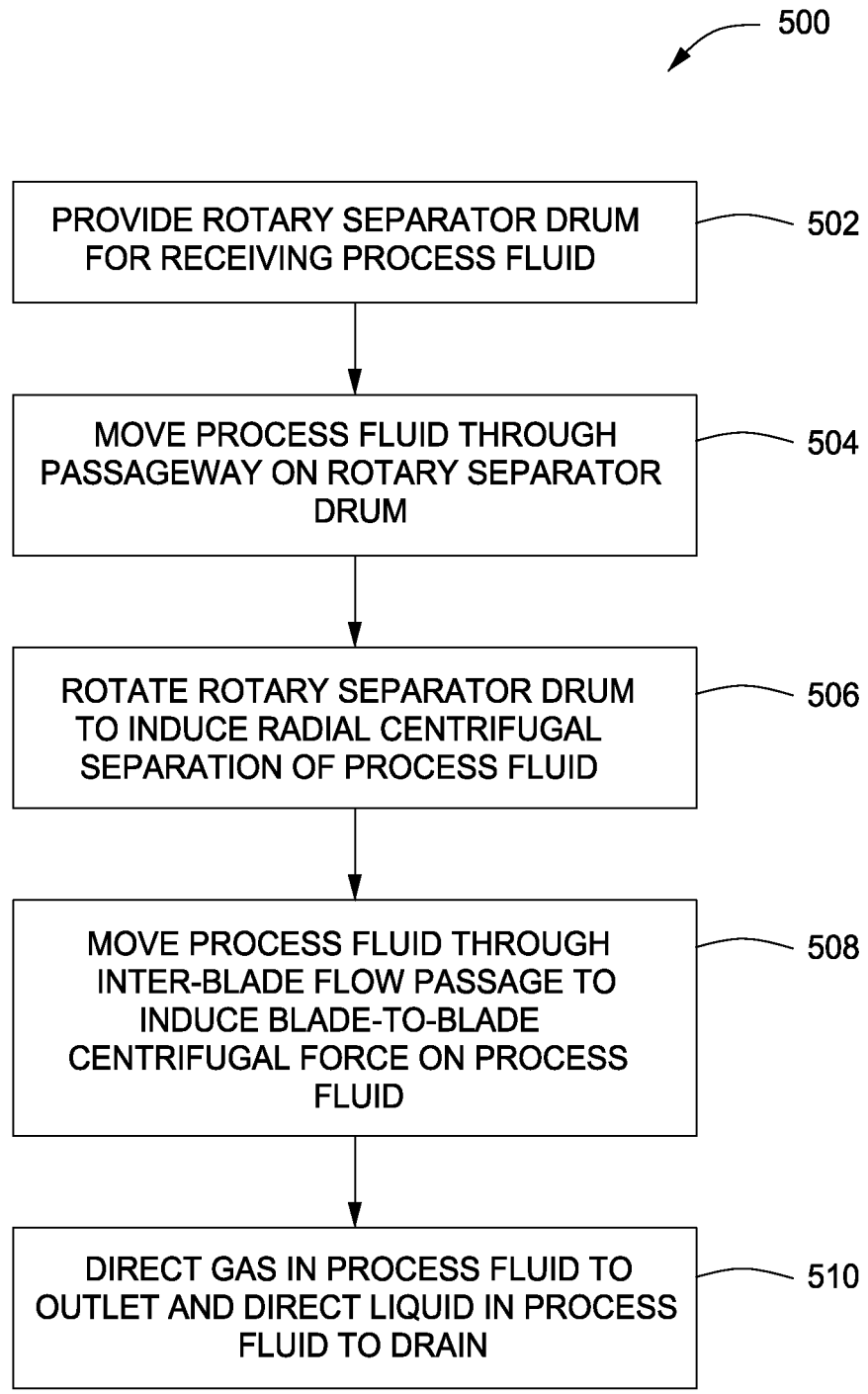
FIG. 9 illustrates a flow chart illustrating an exemplary method for separating a process fluid, in accordance with the disclosure.

FIG. 9, with additional reference to FIGS. 1-8, illustrates a method 500 for separating a higher-density component (e.g., liquid) from a lower-density component (e.g., gas) in a mixed process fluid, according to an exemplary embodiment. Such method 500 may be employed upstream from additional fluid processing equipment such as compressors, turbines, or the like. The method 500 may begin at 502, where a rotary separator drum 102 is provided for receiving the mixed process fluid. The method 500 may then proceed to 504, where the mixed process fluid is moved through a passageway 114 defined in the drum 102. As described above with reference to FIG. 4, for example, the mixed process fluid may be introduced into the drum 102 so as to move generally axially through the passageway 114. At least a portion of the mixed process fluid may continue flowing axially along the length of passageway 114 and pass through exit 117.

The method 500 may proceed to 506, where, as the mixed process fluid moves through the passageway 114, for example, the drum 102 is rotated to induce radial centrifugal separation of the mixed process fluid into at least a higher-density component and a lower-density component. The higher-density component has a greater density than the lower-density component, thus the inertial forces on the higher-density will be greater than those on the lower-density component, resulting in separation of the higher-density component from the lower-density component.

The method may then proceed to 508, in which the mixed process fluid flowing along passageway 114 encounters blades 116 (FIGS. 1-5) and/or 402 (FIGS. 7 and 8) disposed therein. The process fluid may then be forced to flow in the inter-blade flow path 130 and/or 407 defined between adjacent blades 116a, b (FIG. 5) or 402 so as to induce a centrifugal separation of the higher-density and lower-density components of the mixed process fluid. The higher-density component may be guided to the concave surfaces 126 of the blades 116, where the higher-density component coalesces into a film thereon. The continued application of centrifugal forces by rotation of the drum 102 on the coalesced higher-density component causes it to flow outward along the blade 116 to the outer wall 110.

The higher-density component, coalesced and flowing along the concave surfaces 126 of the blades 116, may then be directed to the outer wall 110 of the drum 102 and into a collection chamber 206. The collection chamber 206 may be disposed adjacent to the drum 102, specifically the outer wall 110, and positioned radially outside thereof; further, the collection chamber 206 may be configured to receive the separated higher-density component of the mixed process fluid. Meanwhile, the lower-density component may continue past collection chamber 206 (FIG. 4) in a generally axial flow direction to the outlet 205, as at 510.

While the process fluid has been described as including at least one liquid and at least one gas, and the rotary separator drum has been described as being operable to separate the at least one liquid from the at least one gas, one of skill in the art will recognize that the process fluid may include two fluid components having different densities and that the rotary separator drum may be used to separate those two fluid components without departing from the scope of the present disclosure.

Example

The foregoing discussion can be further described with reference to the following non-limiting example.

Figure 10:
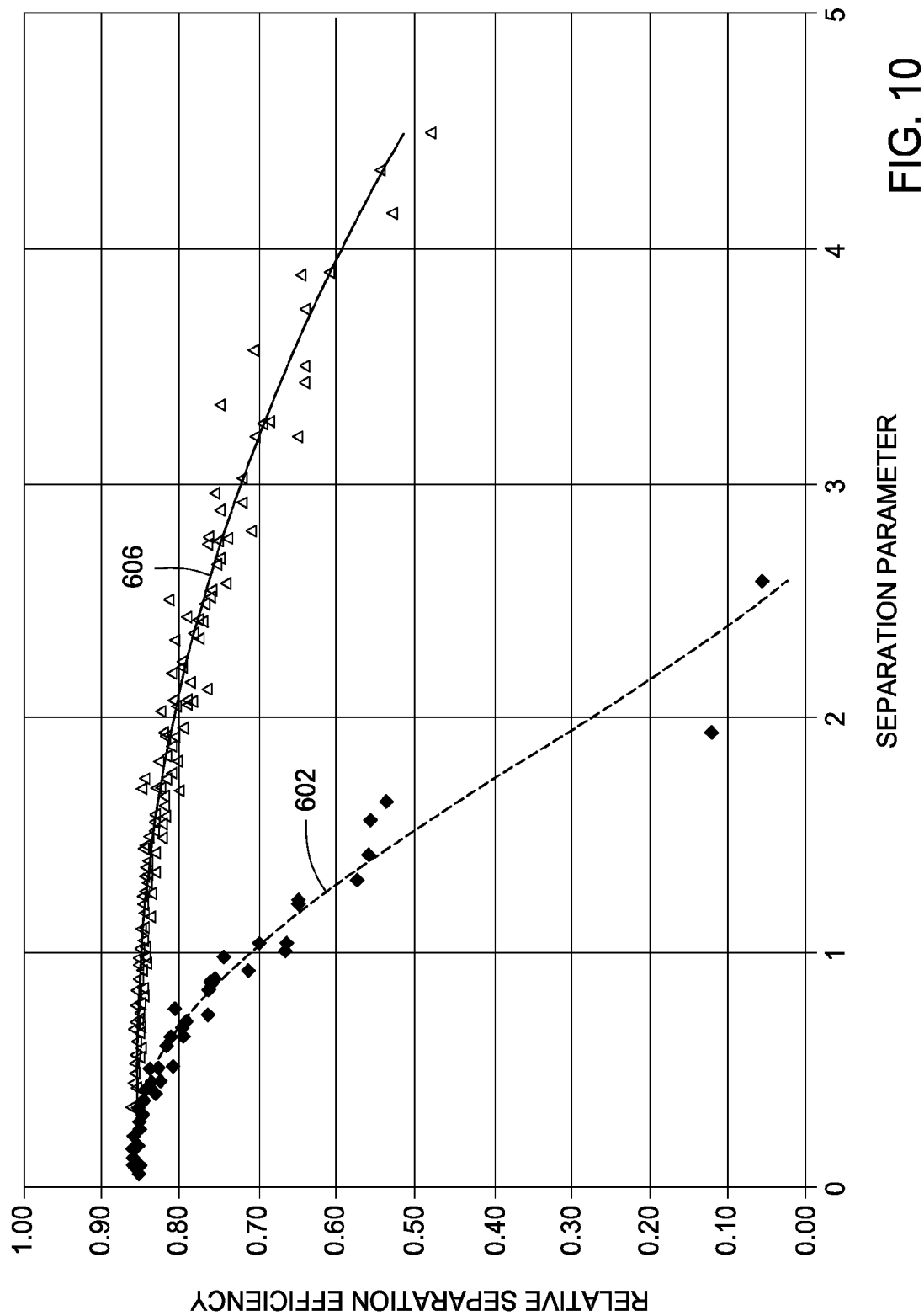
FIG. 10 illustrates a graph illustrating the efficiency of an experimental embodiment of the rotary separator system in comparison to conventional separators, in accordance with the disclosure.
Figure 11:
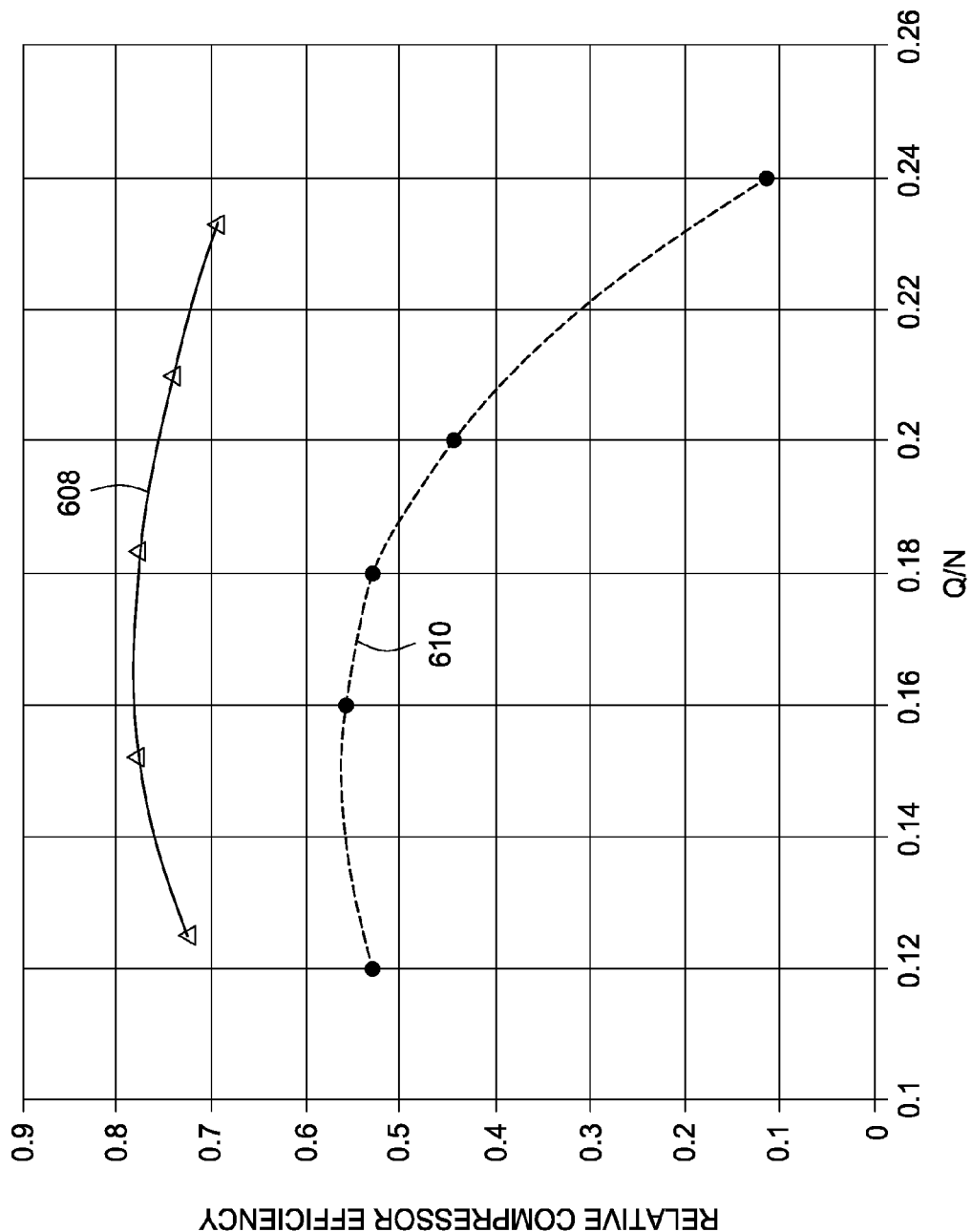
FIG. 11 illustrates a graph illustrating the separation performance of an experimental embodiment of the rotary separator system compared to conventional separators, in accordance with the disclosure.

FIGS. 10 and 11 illustrate experimental result data from an experimental embodiment of the rotary separator system 150 described above. The test conditions were as follows: rotational speed of the rotary separator was set at about 10,000 rpm, the pressure at about 150 pisa, and the temperature at about 100° F. The process fluid consisted of a combination of nitrogen gas and EXXSOL® D60 liquid.

FIG. 10 illustrates a performance comparison between a conventional rotary separator and an embodiment of the rotary separator system 150. Specifically, FIG. 11 shows a graph of relative separation efficiency as a function of a separation parameter. Separation efficiency is generally defined as the ratio of the amount of liquid separated by the rotary separator to the total amount of liquid entering the rotary separator. The graph shows the relative separation efficiency, illustrating the separation efficiency of the tracked results in comparison to a traditional separator system. The separator parameter is generally defined to be the measure of how difficult the separation environment is, that is, how difficult it is to separate the lower-density components from the higher-density components, e.g., the gas from the liquid in the process fluid. The higher the separation parameter, the more difficult it becomes to separate the process fluid. Further, the separation parameter is generally a function of pressure, temperature, and fluid composition, as well as the rotation speed and characteristic diameter of the rotary separator.

Line 602 tracks the relative separation efficiency of the conventional separator, while line 606 tracks the relative separation efficiency of the rotary separator system 150. As the separation parameter increases, lines 602 and 606 diverge. Thus, the conventional rotary separator drops in efficiency relative to the traditional separator as separation conditions become more difficult. In contrast, the rotary separator system 150 maintains increased separation efficiency, even at the higher separation parameter, indicating that the rotary separator system 150 described above substantially outperforms the conventional separator system, even in difficult separation environments.

FIG. 11 illustrates a performance comparison between a compression system using a conventional separator and one using an embodiment of the rotary separator system 150. Specifically, FIG. 11 illustrates relative compressor efficiency as a function of the ratio of the volumetric flow rate of process fluid to the rotation speed of the rotary separator (Q/N). Compressor efficiency is generally defined to mean the amount of work that is transferred to the process fluid by compressor versus the amount of energy consumed by the compression system. Further, the compressor efficiency is shown as relative compressor efficiency, illustrating the advantage of the tracked system over traditional compressor/separator systems. Line 610 tracks the compressor using the conventional rotary separator, while line 608 tracks the compressor using the rotary separator system 150. As will be appreciated, for both lines 608 and 610, as Q/N is increased, relative compressor efficiency decreases. However, at all points, line 608 is above line 610, illustrating that the rotary separator system 150 enables a higher efficiency for the compressor regardless of the Q/N ratio. Further, as the Q/N increases, the relative efficiency of both systems may increase to a maximum value, before falling off. As can be appreciated from the graph, line 610 shows the relative efficiency of the compression system employing the conventional rotary separator dropping more quickly than the relative efficiency of the compression system employing the rotary separator system 150, as shown by line 608. Thus, the rotary separator system 150 outperforms the conventional separator, with differences being increased as the Q/N ratio increases.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A separator apparatus, comprising:
a rotatable drum including an inner wall and an outer wall disposed around the inner wall and radially offset therefrom to define an annular passageway therebetween, the annular passageway extending axially from an inlet at a front surface of the rotatable drum to an outlet at a rear surface of the rotatable drum, the rotatable drum being configured to separate a higher-density component of a fluid from a lower-density component of the fluid such that the higher-density component and the lower-density component of the fluid flow through the outlet of the rotatable drum;
a plurality of blades coupled to the rotatable drum, located in the annular passageway, and being configured to rotate with the rotatable drum, each of the plurality of blades including a leading section, a trailing section, a concave surface, and a convex surface, the concave and convex surfaces extending from the leading section to the trailing section, each of the plurality of blades extending from the inner wall to the outer wall and being disposed circumferentially adjacent to at least another one of the plurality of blades so as to define blade flowpaths therebetween; and
a housing at least partially surrounding the rotatable drum and defining a fluid collection chamber fluidly communicating with the annular passageway via the outlet of the rotatable drum.

2. The separator apparatus of claim 1, wherein each of the blade flowpaths is at least partially defined by the convex surface of at least one of the plurality of blades and the concave surface of at least another one of the plurality of blades.

3. The separator apparatus of claim 1, wherein the rotatable drum is frustoconically-shaped.

4. The separator apparatus of claim 1, wherein each of the plurality of blades leans at an angle of from about 8 degrees to about 22 degrees relative to a radius of the rotatable drum.

5. The separator apparatus of claim 1, wherein each of the plurality of blades extends at least about 60% of an axial length of the rotatable drum.

6. The separator apparatus of claim 5, wherein the trailing section of each of the plurality of blades extends a length that is at least about twice as long as a length of the leading section.

7. The separator apparatus of claim 5, wherein the trailing section is oriented at an angle of from about 90 degrees to about 150 degrees with respect to the leading section.

8. The separator apparatus of claim 1, wherein the plurality of blades comprises first and second rows of blades, the first and second rows disposed axially adjacently to one another.

9. The separator apparatus of claim 8, wherein the concave surface of each of the plurality of blades in the first row faces a first circumferential direction and the concave surface of each of the plurality of blades in the second row of blades faces a second circumferential direction, the first and second circumferential directions being substantially opposing.

10. The separator apparatus of claim 9, wherein the first row of blades turns a process fluid to about a 30 degree angle in the first circumferential direction with respect to an axial direction, and the second row of blades turns the process fluid to about a 30 degree angle in the second circumferential direction with respect to the axial direction.

11. An apparatus for separating a higher-density component from a lower-density component of a process fluid, comprising:
a housing defining a fluid collection chamber, a housing inlet, and a housing outlet;
a drum including an inner wall and an outer wall radially offset from one another and defining a passageway therebetween, the passageway extending an axial length from an inlet at a front surface of the drum to an outlet at a rear surface of the drum, the passageway fluidly communicating with the housing inlet via the inlet of the drum and fluidly communicating with the fluid collection chamber via the outlet of the drum; and
a plurality of blades extending at least partially between the inner and outer walls of the drum and disposed around the drum and at least partially along the axial length of the passageway, each of the plurality of blades having a leading section, a trailing section, a convex surface, and a concave surface, the convex and concave surfaces extending from the leading section to the trailing section.

12. The apparatus of claim 11, wherein the plurality of blades comprises first and second blades, the first and second blades being circumferentially offset from each other to define a blade flowpath therebetween, the blade flowpath being at least partially defined between the convex surface of the first blade and the concave surface of the second blade.

13. The apparatus of claim 11, wherein, in each of the plurality of blades, the trailing section extends a length that is at least about twice as long as a length of the leading section, and the trailing section is oriented is oriented at an angle of from about 110 degrees to about 130 degrees with respect to the leading section.

14. The apparatus of claim 13, wherein each of the plurality of blades extends along at least 80% of the axial length of the passageway.

15. The apparatus of claim 11, wherein the plurality of blades comprises first and second rows of blades, the leading section of each of the plurality of blades of the first row of blades being proximal the inlet of the drum, the leading section of each of the plurality of blades of the second row of blades being proximal the trailing section of at least one of the plurality of blades of the first row of blades, the first and second rows of blades being circumferentially staggered to define an inter-blade flowpath, the plurality of blades of the first row of blades turning a process fluid about 30 degrees in a first circumferential direction and the plurality of blades of the second row of blades turning the process fluid about 30 degrees in an opposite circumferential direction.

* * * * *